(12) United States Patent
Schiffbauer et al.

(10) Patent No.: US 11,971,580 B2
(45) Date of Patent: Apr. 30, 2024

(54) FIBER OPTIC STORAGE DEVICES FOR FIBER DISTRIBUTION HUBS

(71) Applicant: PPC BROADBAND, INC., East Syracuse, NY (US)

(72) Inventors: Robert Schiffbauer, Olathe, KS (US); Steven M. Waldren, Roanoke, VA (US)

(73) Assignee: PPC BROADBAND, INC., East Syracuse, NY (US)

(*) Notice: Subject to any disclaimer, the term of this patent is extended or adjusted under 35 U.S.C. 154(b) by 35 days.

(21) Appl. No.: 17/447,056

(22) Filed: Sep. 7, 2021

(65) Prior Publication Data

US 2022/0075122 A1 Mar. 10, 2022

Related U.S. Application Data

(60) Provisional application No. 63/074,944, filed on Sep. 4, 2020.

(51) Int. Cl.
*G02B 6/00* (2006.01)
*G02B 6/36* (2006.01)
*G02B 6/44* (2006.01)

(52) U.S. Cl.
CPC ......... *G02B 6/3616* (2013.01); *G02B 6/4452* (2013.01)

(58) Field of Classification Search
CPC .. G02B 6/3616; G02B 6/4452; G02B 6/3897; G02B 6/00
See application file for complete search history.

(56) References Cited

U.S. PATENT DOCUMENTS

| | | | |
|---|---|---|---|
| 2006/0008231 A1* | 1/2006 | Reagan ................. | H04Q 1/021 385/135 |
| 2008/0298764 A1 | 12/2008 | Bloodworth et al. | |
| 2010/0031022 A1 | 2/2010 | Kramer | |
| 2010/0086260 A1 | 4/2010 | Parikh et al. | |
| 2010/0310226 A1* | 12/2010 | Wakileh ............... | G02B 6/3849 385/139 |
| 2012/0033926 A1* | 2/2012 | de Jong ............... | G02B 6/3897 385/137 |

OTHER PUBLICATIONS

Search Report dated Nov. 19, 2021 in corresponding International Application No. PCT/US2021/071384, 4 pages.
Written Opinion dated Nov. 19, 2021 in corresponding International Application No. PCT/US2021/071384, 7 pages.

* cited by examiner

*Primary Examiner* — Jennifer Doan
(74) *Attorney, Agent, or Firm* — MH2 TECHNOLOGY LAW GROUP LLP

(57) ABSTRACT

A fiber optic storage module configured to be coupled with a fiber distribution hub includes a first wall and a second wall that extends from a first end of the first wall in a direction perpendicular to the first wall. The first wall includes a retaining structure configured to receive and retain a cable portion of a fiber optic cable, and the second wall includes a cutout configured to receive a dust cap coupled with a connector that terminates the fiber optic cable.

37 Claims, 4 Drawing Sheets

FIBER OPTIC STORAGE DEVICES FOR FIBER DISTRIBUTION HUBS

CROSS-REFERENCE TO RELATED APPLICATION

This application claims the benefit of U.S. Provisional Application No. 63/074,944, filed on Sep. 4, 2020. The disclosure of the prior application is hereby incorporated by reference herein in its entirety.

TECHNICAL FIELD

The present disclosure relates generally to fiber optic distribution systems and, more particularly, to fiber optic storage devices for fiber distribution hubs used in fiber optic distribution systems.

BACKGROUND

One type of fiber optic distribution system is a point-to-multipoint system. In point-to-multipoint systems, a single optical fiber from a service provider's central office services multiple optical network units at the end-user locations, for example, residences, apartments, or businesses. For example, a single optical fiber can service one hundred and twenty eight end users. Optical components such as switches and routers in active optical networks, unpowered optical splitters in passive optical networks (PONS), and fiber optic cables distribute the optical signals between the service providers location and the end users. A fiber distribution hub (FDH) may be configured as an enclosure that can house these optical components.

Because each feeder fiber from a service provider's central office can be optically coupled to hundreds of outgoing distribution fibers, FDHs often have a high density of fiber optic cables and a large quantity of optical components to distribute the signal from the feeder cable to the fibers of the distribution cable. For example, in a PON, an FDH may include several splicing cassettes that optically couple a feeder cable with multiple optical splitters and multiple adapters for optically coupling the splitters to the distribution cable. A number of the fiber optic cables at the FDH are terminated with fiber optic connectors but are unused. That is, the terminated fiber optic cables are provided at the FDH to allow for future expansion of the network.

Accordingly, it may be desirable for an FDH to provide a device for storing the unused or static fiber connectors. More particularly, it may also be desirable for an FDH to provide a device for safely and securely storing the unused fiber connectors by retaining a cable portion of a fiber optic cable. It may also be desirable to provide easy access to the stored connectors and removal of the stored connectors from the storage device without requiring a technician to grip the connector and remove the connector from a connector holder.

SUMMARY

According to various aspects of the disclosure, a fiber optic storage module configured to be coupled with a fiber distribution hub includes a first wall and a second wall that extends from a first end of the first wall in a direction perpendicular to the first wall. The first wall includes a retaining structure configured to receive and retain a cable portion of a fiber optic cable, and the second wall includes a cutout configured to receive a dust cap coupled with a connector that terminates the fiber optic cable.

In some aspects, the retaining structure includes an opening configured to receive and retain the cable portion of the fiber optic cable. In various aspects, the retaining structure comprises a curved flexible finger that defines the opening. In some aspects, the curved flexible finger is configured to grip the cable portion of the fiber optic cable. In some aspects, the curved flexible finger is configured to loosely retain the cable portion of the fiber optic cable.

In various aspects, the first wall includes at least one slit that defines a plurality of flexible tabs.

In some aspects, the cutout is configured to limit lateral movement of the connector relative to the first wall and the second wall.

In various aspects, the first wall includes a second retaining structure configured to receive and retain a cable portion of a second fiber optic cable, and the second wall includes a second cutout configured to receive a dust cap coupled with a connector that terminates the second fiber optic cable.

In some aspects, the second wall is configured to be coupled with a mounting panel of a fiber distribution hub. In various aspects, the second wall includes an opening configured to receive a fixing device that is configured to couple the second wall to the mounting panel. In various aspects, the mounting panel is configured to be removably coupled with the fiber distribution hub.

According to various aspects of the disclosure, a fiber distribution hub includes a frame body including a mounting panel and one of the aforementioned the fiber optic storage modules coupled with the mounting panel.

In some aspects, fiber distribution hub includes at least one adapter coupled to the frame body.

In various aspects of the fiber distribution hub, the mounting panel is configured to be removably coupled with the frame body.

The foregoing and other features of construction and operation of the invention will be more readily understood and fully appreciated from the following detailed disclosure, taken in conjunction with accompanying drawings. Throughout the description, like reference numerals will refer to like parts in the various embodiments and drawing figures.

DETAILED DESCRIPTION OF EMBODIMENTS

As a preface to the detailed description, it should be noted that, as used in this specification and the appended claims, the singular forms "a," "an," and "the" include plural referents, unless the context clearly dictates otherwise.

The embodiment(s) described, and references in the specification to "one embodiment", "an embodiment", "an example embodiment", etc., indicate that the embodiment(s) described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is understood that it is within the knowledge of one skilled in the art to effect such feature, structure, or characteristic in connection with other embodiments whether or not explicitly described.

Figure 1:
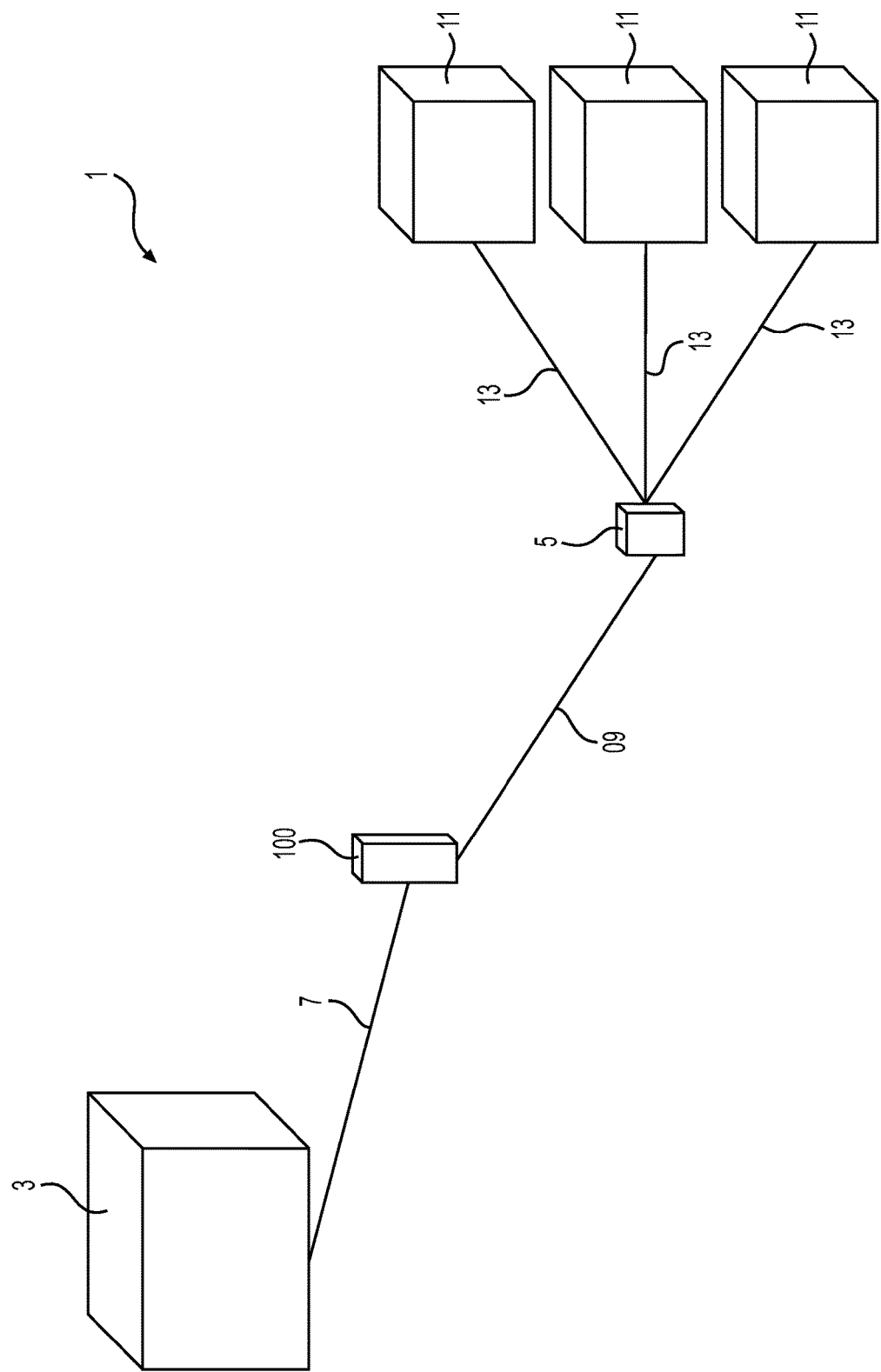
FIG. 1 is a schematic illustration of a fiber distribution system using a fiber distribution hub.

FIG. 1 schematically illustrates a fiber optic distribution system 1. As shown in FIG. 1, fiber optic distribution system 1 can include a service provider location 3 and one or more access terminals 5. Service provider location 3 may be a service provider central office or a local service provider supply location. A fiber distribution hub (FDH) 100 optically couples service provider location 3 to access terminal 5. FDH 100 can receive one or more multi-fiber feeder cables 7 from service provider location 3. FDH 100 provides optical signals to end users 11 by one or more distribution cables 9 that interface access terminal 5. End users 11 receive the optical signals from access terminal 5 through one or more drop cables 13. In some embodiments, a number of subscribers may be routed to FDH 100 for connection to optical splitters housed therein. The splitters split the optical signal in feeder fibers into a plurality of signals for distribution to the end users through a multi-fiber distribution cable. A person skilled in the relevant art would understand that FDH 100 can be used in fiber optic distribution systems that vary from the one illustrated in FIG. 1. For example, FDHs can be used in high fiber density applications such as data centers.

It should be appreciated that the FDH 100 can be any fiber distribution hub configured to include one or more fiber optic storage modules 110 (FIG. 2), as described below in more detail. It should be further understood that the FDH 100 can be an enclosed hub or an enclosure-less hub. The FDH 100 may include a frame or chassis (not shown) configured to receive the one or more fiber optic storage modules 110. In some embodiments, the frame or chassis may be configured to receive one or more mounting panels 170 (FIG. 7), and each mounting panel 170 is configured to receive one or more fiber optic storage modules 110.

Referring now to FIGS. 2-7, an exemplary embodiment of a fiber optic storage module 110 in accordance with various aspects of the disclosure is illustrated. The fiber optic storage module 110 includes a first wall 112 and a second wall 114. The second wall 114 extends substantially perpendicular to the first wall 112 at a first end 116 of the first wall 112. Retaining structures 120 extend substantially perpendicular to the first wall at a second end 118 of the first wall 112 and are substantially parallel to the second wall 114.

As shown in FIGS. 3-7, the retaining structures 120 are configured to selectively couple with the ends of fiber optic cables 180 (for example, splitter output cables) when the fiber optic cables are not connected to adapters in the FDH 100. In some embodiments, each end of the fiber optic cable 180 includes a cable portion 182, a connector 184, and a boot 186. In some embodiments, as shown in FIGS. 3-7, each fiber optic storage module 110 can include ten retaining structures 120. Although the illustrated embodiment shows ten retaining structures 120, the fiber optic storage module 110 can include less than or more than ten retaining structures 120.

Figure 2:
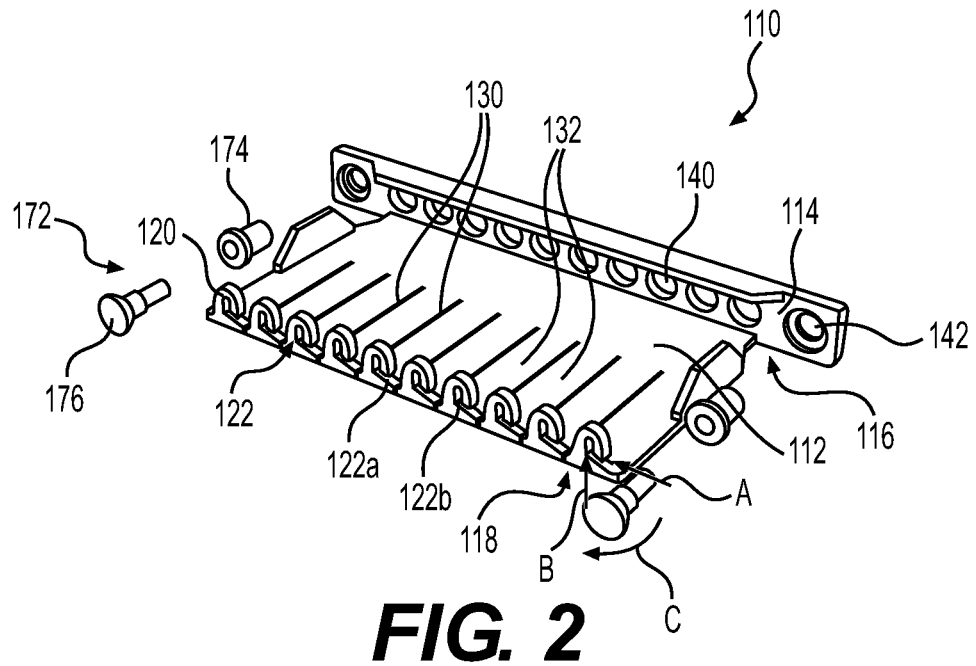
FIG. 2 is a first perspective view of an exemplary fiber optic storage module in accordance with various aspects of the disclosure.

Referring to FIGS. 3-7, each retaining structure 120 can be configured to receive the cable portion 182 of a connectorized end of a fiber optic cable 180. As illustrated in FIG. 2, the retaining structure 120 can be configured as a curved finger that includes an opening 122 sized and arranged to receive and retain the cable portion 182 of the fiber optic cable 180. For example, the opening 122 may include an entrance portion 122a that is smaller than a middle retention portion 122b such that once the cable portion 182 of the fiber optic cable 180 is received in the middle retention portion 122b, the retaining structure 120 prevents the cable portion 182 from inadvertent removal from the opening 122.

In some embodiments, the retaining structure 120 may have a degree of flexibility that permits the retaining structure 120 to flex by an amount that permits the cable portion 182 of the fiber optic cable 180 to be inserted through the entrance portion 122a and into the middle retention portion 122b of the opening 122.

In some embodiments, the retaining structure 120 may be sized and arranged such when the cable portion 182 is received in the middle retention portion 122b of the opening 122, the retaining structure 120 grips and holds the cable portion 182. In other embodiments, the retaining structure 120 may be sized and arranged such when the cable portion 182 is received in the middle retention portion 122b of the opening 122, the retaining structure 120 loosely retains the cable portion 182. In various embodiments, the opening 122 may be sized such that the boot 186 of the fiber optic cable 180 can pass through the opening 122. As such, that the retaining structure 120 can limit relative movement between the connector 184 and the first and second walls 112, 114 in a first direction that extends from the first end 116 to the second end 118.

In some embodiments, the retaining structure 120 can be configured to be received in a circumferential groove of a grooved cable such as, for example, PPC's Miniflex® Fiber Cable. The retaining structure 120 and the groove of the grooved cable can cooperate to prevent or limit relative movement between the connector 184 and the first and second walls 112, 114 in the first direction.

Figure 3:
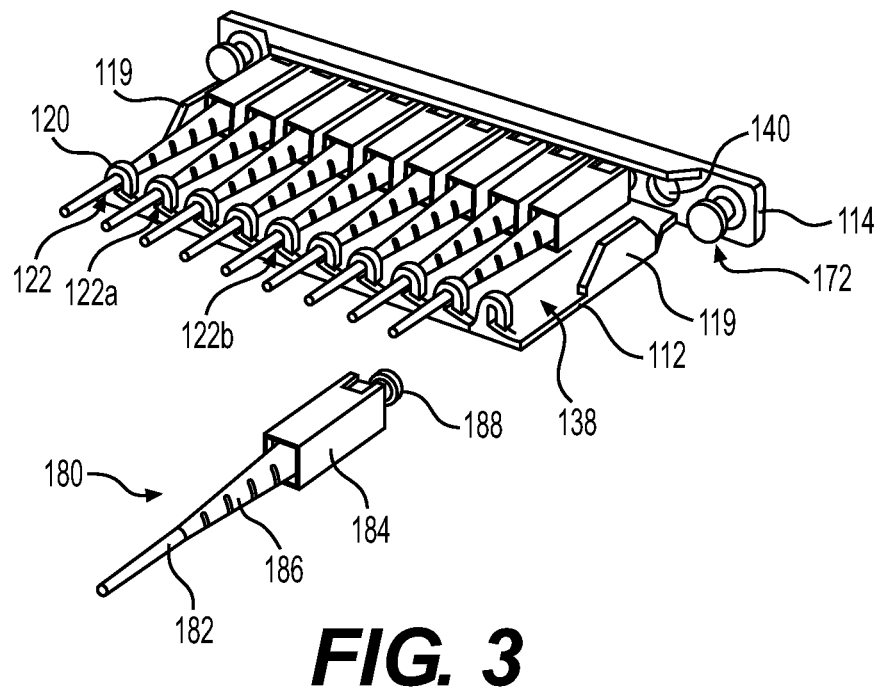
FIG. 3 is the first perspective view of the exemplary fiber optic storage module of FIG. 2 populated with fiber optic cables.
Figure 4:
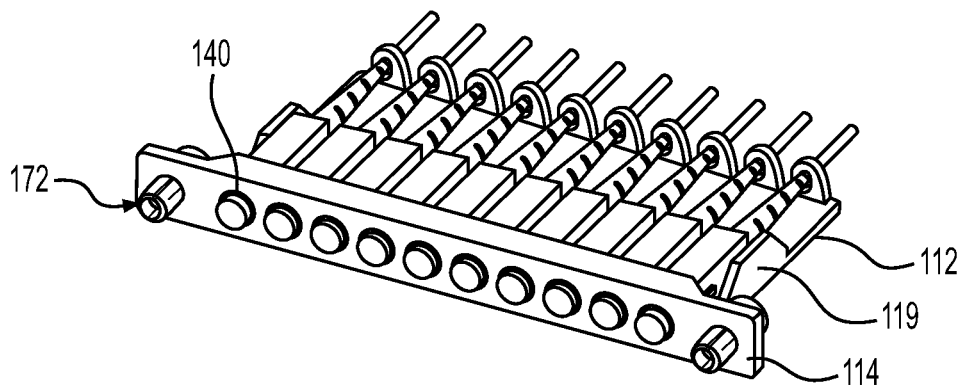
FIG. 4 is a second perspective view of the exemplary fiber optic storage module populated with fiber optic cables of FIG. 3.
Figure 5:
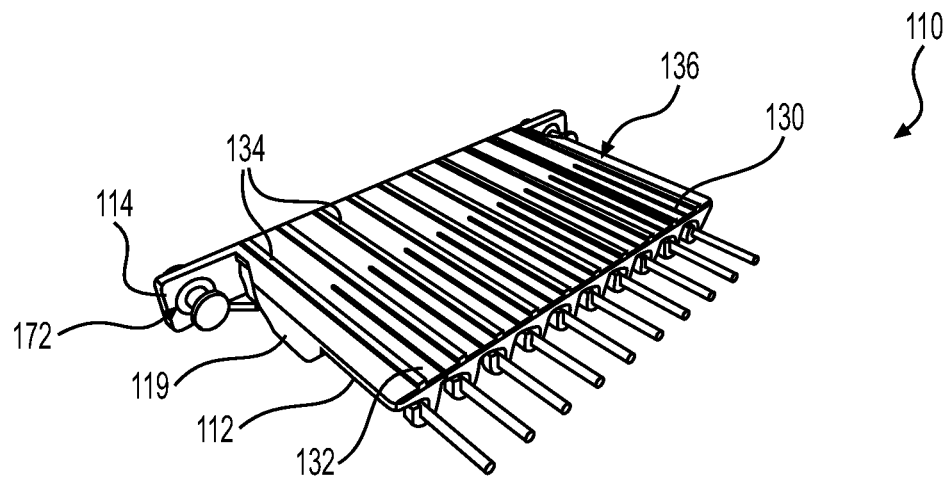
FIG. 5 is a third perspective view of the exemplary fiber optic storage module populated with fiber optic cables of FIG. 3.
Figure 6:
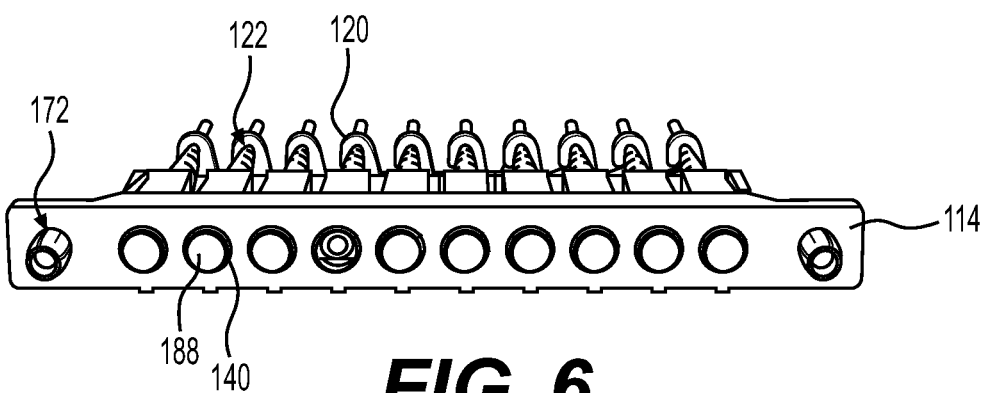
FIG. 6 is a fourth perspective view of the exemplary fiber optic storage module populated with fiber optic cables of FIG. 3.

Referring to FIG. 3, the first wall 112 of the fiber optic storage module 110 includes one or more slots 130 extending at least part of the way from the second end 118 toward the first end 116. The slots 130 define a plurality of flexible tabs 132 of the first wall 112. Each of the flexible tabs 132 includes one of the retaining structures 120. Each of the flexible tabs 132 is configured to independently flex up and down relative to one another to facilitate installation and removal of the connector 184 of the fiber optic cable 180 into and from the fiber optic storage module 110. As shown in FIG. 5, each of the flexible tabs 132 may include a stiffening rib 134 on an underside 136 of the first wall 112 to provide support for each of the independent flexible tabs 132.

It should be appreciated that, in some embodiments, the retaining structure 120 may be spaced from the second wall 114 by a distance that substantially matches a combined length of the connector 184 and the boot 186. In some embodiments, the retaining structure 120 may be spaced from the second wall 114 by a distance that is greater than a combined length of the connector 184 and the boot 186. In some embodiments, an upper side 138 of the first wall 112 may include ribs (not shown) that project upward from the upper side 138 and are configured to engage the connector 184 from sliding from the first end 116 toward the second end 118, particularly in a configuration where the boot 186 is spaced from the retaining structure 120.

Referring now to FIGS. 2-4 and 6, the second wall 114 may include one or more cutouts 140. Each of the cutouts 140 is substantially aligned with the opening 122 of one of the retaining structures 120 and one of the flexible tabs 132 in the first direction that extends from the first end 116 to the second end 118. Each of the cutouts 140 is sized and configured to receive a dust cap 188 affixed to a front end of the connector 184 so as to cover a ferrule (not shown) of the fiber optic cable 180. In some aspects, the cutouts 140 are sized to loosely receive the dust cap 188 in a manner that limits side-to-side and up-and-down movement of the connectors 184 of the fiber optic cables 180 stored at the fiber optic storage module 110. The cutouts 140 may also be used as a visual window for light tracing when one of the dust caps 188 is removed from a respective connector 184. Although the illustrated embodiment includes circular cutouts 140, the cutouts may be any shape that is sized and configured to receive the dust caps 188 of the fiber optic cable 180 in a manner that limits side-to-side and up-and-down movement of the connectors 184 of the fiber optic cables 180 stored at the fiber optic storage module 110.

The first wall 112 may include side walls 119 that extend upward from the upper side 138 of the first wall 112 at lateral sides of the first wall that extend from the first end 116 to the second end 118. The side walls 119 are configured to limit lateral movement of the connectors 184 stored at the fiber storage module 110.

Figure 7:
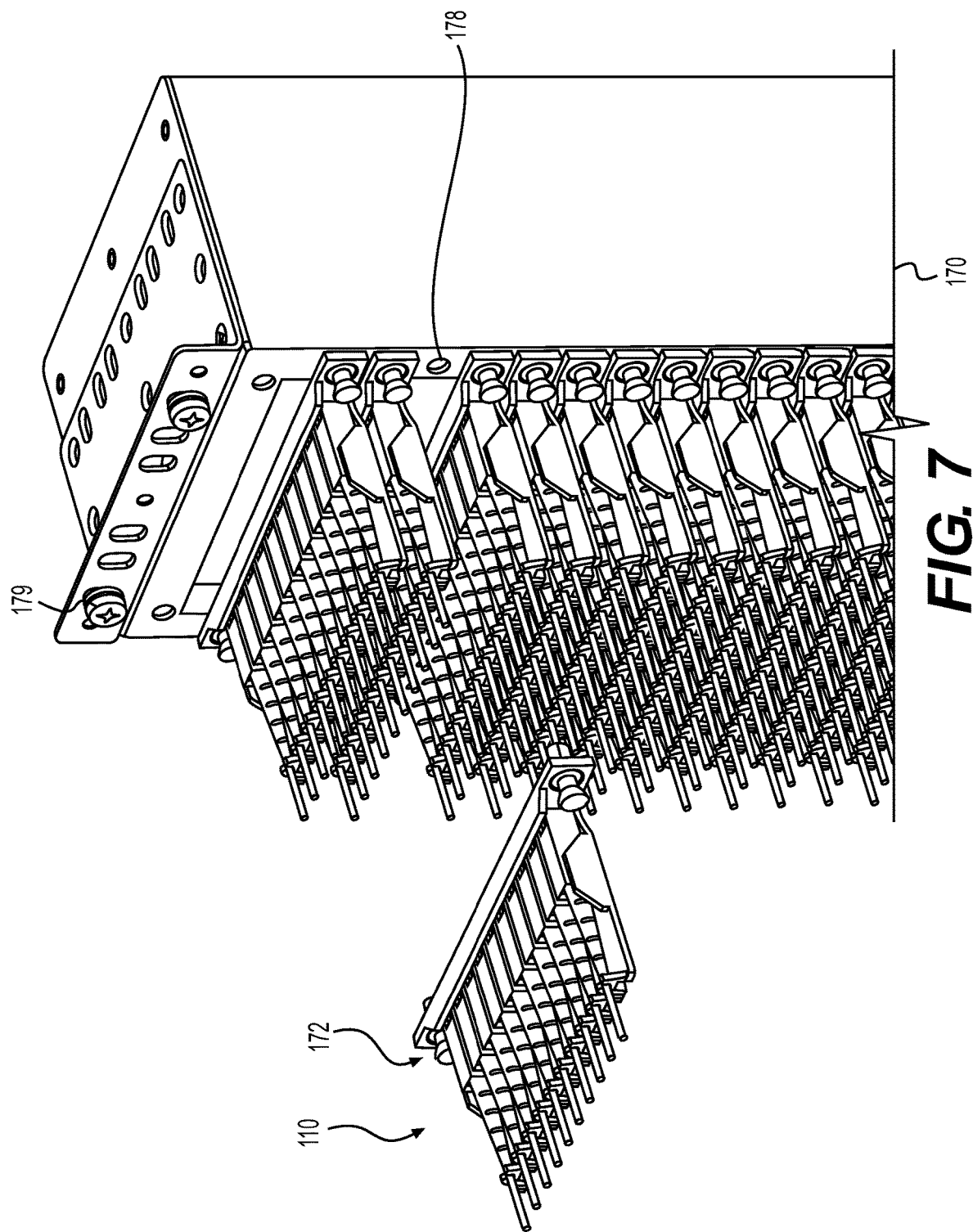
FIG. 7 is a perspective view of an exemplary mounting panel and the exemplary fiber optic storage module populated with fiber optic cables of FIG. 3.

Referring now to FIGS. 2 and 7, the fiber optic storage module 110 may be configured to be coupled with the mounting panel 170 by one or more fixing devices 172. For example, the second wall 114 of the fiber optic storage module 110 may include openings 142 at opposite lateral ends thereof. Each of the openings 142 is configured to receive one of the fixing devices 172. In some embodiments, the fixing device 172 may include an anchor 174 and a pin 176. The anchor 174 may have a degree of flexibility that permits the anchor 174 to be inserted through one of the openings 142 in the second wall 114 and into a corresponding opening 178 of the mounting panel 170. When the pin 176 is inserted into the anchor 174, the pin 176 causes the anchor to expand so as to secure the fiber optic storage module 110 to the mounting panel 170.

In some embodiments, the mounting panel 170 may be removably attachable to a frame or chassis of the FDH 100, for example, via fasteners 179 such as screws, pins, or the like. In some aspects, the mounting panel 170 may be integral with the frame or chassis as a single piece of unitary construction.

In use, when it is desired to store a pre-terminated fiber optic cable 180 that is not connected to an adapter of the FDH 100, the fiber optic cable 180 may be stored at the fiber optic storage module 110. The fiber optic storage module 110 permits a technician to couple the connector 184 with the fiber optic storage module 110 without the need to grip the connector 184 and without having to attach the connector 184 to a connector holder. Instead, the technician can simply grasp the cable portion 182 at a distance from the connector 184 and insert the dust cap 188 into an open one of the cutouts 140. The technician can then urge a corresponding one of the flexible tabs 132 in a downward direction to facilitate easier coupling of the connector 184 with the fiber optic storage module 110. The technician can then hold the cable portion 182 a distance from the connector 184, without gripping the connector 184 itself, and move the cable portion 182 of the fiber optic cable 180 in a right-to-left direction (as indicated by arrow A in FIG. 3) through the entrance portion 122a of the opening 122 and then in an upward direction (as indicated by arrow B in FIG. 3) into the middle retention portion 122b of the retaining structure 120. In some aspects, the cable portion 182 can be coupled with the retaining structure 120 by holding the cable portion 182 a distance from the connector 184, without gripping the connector 184 itself, and moving the cable portion 182 of the fiber optic cable 180 in a clockwise direction (as indicated by arrow C in FIG. 3) through the entrance portion 122a of the opening 122 and into the middle retention portion 122b of the retaining structure 120. The flexible tab 132 may be permitted to return to its rest position prior to or after the cable portion 182 is inserted into the opening 122. After the technician has attached one or more fiber optic cables 180 to the fiber optic storage module 110, the fiber optic storage module 110 can be fixedly attached to the mounting panel 170 with one or more fixing devices 172.

When a technician needs to remove the connector 184 from the fiber optic storage module 110, for example, for connection with an adapter, the technician can disengage the cable portion 182 from the retaining structure 120 by holding the cable portion 182 a distance from the connector 184, without gripping the connector 184 itself, and move the cable portion 182 of the fiber optic cable 180 in a downward direction (opposite to arrow B in FIG. 3) from the middle retention portion 122b and then in a left-to-right direction (opposite to arrow A in FIG. 3) out through the entrance portion 122a of the opening 122. In some aspects, the cable portion 182 of the fiber optic cable 180 can be disengaged from the retaining structure 120 by holding the cable portion 182 a distance from the connector 184, without gripping the connector 184 itself, and moving the cable portion in a counter-clockwise direction (opposite to arrow C in FIG. 3) from the middle retention portion 122b of the retaining structure 120 and out through the entrance portion 122a of the opening 122. The dust cap 188 can then be removed from the cutout 140. The technician can urge a corresponding one of the flexible tabs 132 in a downward direction to facilitate easier removal of the connector 184 from the fiber optic storage module 110.

It should be understood that the flexible tabs 132 provide easy access to the stored connectors and facilitate removal of the cable portion 182 from the retaining structure 120 without the need to grip the connector 184. Further, the retaining structure 120 and cutouts 140 permit removal of the stored connectors from the fiber optic storage module 110 without requiring a technician to grip the connector 184 and remove the connector from a connector holder. Indeed, the technician can remove the connector 184 from the fiber optic storage module 110 by simply gripping the fiber optic cable 180 a distance from the connector 184, removing the cable portion 182 from the retaining structure 120, and pulling the fiber optic cable 180 to remove the dust cap 188 from the cutout 140.

In some embodiments, the fiber optic storage module 170 can be used with fiber optic devices other than FDH 100. For example, the fiber optic storage module 170 can be used with a fiber optic modular rack-chassis system.

It should be appreciated that while the retaining structures 120 are illustrated in FIG. 3 such that the cable portion 182 of the fiber optic cable 180 is inserted into the opening in a right-to-left direction, the configuration of the retaining structure can be reversed such that the cable portion 182 of the fiber optic cable 180 is inserted into the opening in a left-to-right direction.

It should also be appreciated that the retaining structures 120 illustrated in FIG. 3 can be rotated 90° such that the cable portion 182 of the fiber optic cable 180 is inserted into the opening in a top-to-bottom direction.

It should further be appreciated that the configuration of the retaining structures 120 can be modified to any shape that is configured to received and retain the cable portion 182 of the fiber optic cable 180. For example, the retaining structures 120 can include a finger that defines two openings such that the cable portion 182 can be inserted from right-to-left or from left-to-right.

Although the present embodiments have been described with reference to specific example embodiments, it will be evident that various modifications may be made to these embodiments without departing from the broader spirit and scope of the various embodiments. Accordingly, the specification and the drawings are regarded in an illustrative rather than a restrictive sense.

The present invention has been described above with the aid of functional building blocks illustrating the implementation of specified functions and relationships thereof. The boundaries of these functional building blocks have been arbitrarily defined herein for the convenience of the description. Alternate boundaries can be defined so long as the specified functions and relationships thereof are appropriately performed.

The foregoing description of the specific embodiments will so fully reveal the general nature of the invention that others can, by applying knowledge within the skill of the art, readily modify and/or adapt for various applications such specific embodiments, without undue experimentation, without departing from the general concept of the present invention. Therefore, such adaptations and modifications are intended to be within the meaning and range of equivalents of the disclosed embodiments, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance.

The breadth and scope of the present invention should not be limited by any of the above-described exemplary embodiments, but should be defined only in accordance with the following claims and their equivalents.

What is claimed is:

1. A fiber optic storage module configured to be coupled with a fiber distribution hub, the fiber optic storage module comprising:
   a first wall;
   a second wall that extends from a first end of the first wall in a direction perpendicular to the first wall;
   wherein the first wall includes a retaining structure configured to receive and retain a cable portion of a fiber optic cable;
   wherein the first wall includes at least one slit that defines a plurality of flexible tabs;
   wherein the second wall includes a cutout configured to receive a dust cap coupled with a connector that terminates the fiber optic cable;
   wherein the cutout is configured to limit lateral movement of the connector relative to the first wall and the second wall; and
   wherein the retaining structure includes an opening configured to receive and retain the cable portion of the fiber optic cable.

2. The fiber optic storage module of claim 1, wherein the second wall is configured to be coupled with a mounting panel of a fiber distribution hub.

3. The fiber optic storage module of claim 1, wherein the first wall includes a second retaining structure configured to receive and retain a cable portion of a second fiber optic cable; and
   wherein the second wall includes a second dust cap receiving portion configured to receive a dust cap coupled with a connector that terminates the second fiber optic cable.

4. A fiber optic storage module configured to be coupled with a fiber distribution hub, the fiber optic storage module comprising:
   a first wall;
   a second wall that extends from a first end of the first wall in a direction perpendicular to the first wall;
   wherein the first wall includes a retaining structure configured to receive and retain a cable portion of a fiber optic cable;
   wherein the second wall includes a cutout configured to receive a dust cap coupled with a connector that terminates the fiber optic cable; and
   wherein the retaining structure includes an opening configured to receive and retain the cable portion of the fiber optic cable.

5. The fiber optic storage module of claim 4, wherein the second wall is configured to be coupled with a mounting panel of a fiber distribution hub.

6. The fiber optic storage module of claim 4, wherein the first wall includes at least one slit that defines a plurality of flexible tabs.

7. The fiber optic storage module of claim 4, wherein the cutout is configured to limit lateral movement of the connector relative to the first wall and the second wall.

8. The fiber optic storage module of claim 4, wherein the first wall includes a second retaining structure configured to receive and retain a cable portion of a second fiber optic cable; and
   wherein the second wall includes a second cutout configured to receive a dust cap coupled with a connector that terminates the second fiber optic cable.

9. A fiber optic storage module configured to be coupled with a fiber distribution hub, the fiber optic storage module comprising:
   a first wall;
   a second wall that extends from a first end of the first wall in a direction perpendicular to the first wall;
   wherein the first wall includes a retaining structure configured to receive and retain a cable portion of a fiber optic cable; and
   wherein the second wall includes a cutout configured to receive a dust cap coupled with a connector that terminates the fiber optic cable.

10. The fiber optic storage module of claim 9, wherein the retaining structure includes an opening configured to receive and retain the cable portion of the fiber optic cable.

11. The fiber optic storage module of claim 10, wherein the retaining structure comprises a curved flexible finger that defines the opening.

12. The fiber optic storage module of claim 11, wherein the curved flexible finger is configured to grip the cable portion of the fiber optic cable.

13. The fiber optic storage module of claim 11, wherein the curved flexible finger is configured to loosely retain the cable portion of the fiber optic cable.

14. The fiber optic storage module of claim 9, wherein the first wall includes at least one slit that defines a plurality of flexible tabs.

15. The fiber optic storage module of claim 9, wherein the cutout is configured to limit lateral movement of the connector relative to the first wall and the second wall.

16. The fiber optic storage module of claim 9, wherein the first wall includes a second retaining structure configured to receive and retain a cable portion of a second fiber optic cable; and
wherein the second wall includes a second cutout configured to receive a dust cap coupled with a connector that terminates the second fiber optic cable.

17. The fiber optic storage module of claim 9, wherein the second wall is configured to be coupled with a mounting panel of a fiber distribution hub.

18. The fiber optic storage module of claim 17, wherein the second wall includes an opening configured to receive a fixing device that is configured to couple the second wall to the mounting panel.

19. The fiber optic storage module of claim 17, wherein mounting panel is configured to be removably coupled with the fiber distribution hub.

20. A fiber distribution hub comprising:
a frame body including a mounting panel; and
the fiber optic storage module of claim 9 coupled with the mounting panel.

21. The fiber distribution hub of claim 20, further comprising at least one adapter coupled to the frame body.

22. The fiber distribution hub of claim 20, wherein the mounting panel is configured to be removably coupled with the frame body.

23. The fiber optic storage module of claim 9, wherein a portion of the retaining structure is structurally configured to extend in a direction parallel to the first wall, the retaining structure is structurally configured to define an opening, the opening comprises a middle retention portion and an entrance portion, and the entrance portion is structurally configured to be smaller in cross-sectional area than the middle retention portion.

24. The fiber optic storage module of claim 9, wherein the retaining structure is structurally configured to receive and retain no additional cable portions in addition to the cable portion of the fiber optic cable.

25. The fiber optic storage module of claim 9, wherein the cable portion of the fiber optic cable is non-inclusive of a boot of the fiber optic cable and is non-inclusive of the connector of the fiber optic cable.

26. The fiber optic storage module of claim 4, wherein the cut out is a dust cap receiving portion.

27. The fiber optic storage module of claim 26, wherein the dust cap receiving portion is structurally configured to provide a visual window for tracing light from the fiber optic cable when the dust cap is removed.

28. The fiber optic storage module of claim 4, wherein the opening is structurally configured to receive and retain no additional cable portions in addition to the cable portion of the fiber optic cable.

29. The fiber optic storage module of claim 4, wherein the cable portion of the fiber optic cable is non-inclusive of a boot of the fiber optic cable and is non-inclusive of the connector of the fiber optic cable.

30. A fiber optic storage module configured to be coupled with a fiber distribution hub, the fiber optic storage module comprising:
a first wall portion;
a second wall portion that extends from a first end of the first wall portion;
wherein the first wall portion includes a retaining portion configured to receive and retain a cable portion of a fiber optic cable;
wherein the second wall includes a dust cap receiving portion configured to receive a dust cap coupled with a connector that terminates the fiber optic cable; and
wherein the dust cap receiving portion is configured to extend through the second wall so as to provide a visual window for tracing light from the fiber optic cable when the dust cap is removed.

31. The fiber optic storage module of claim 30, wherein the dust cap receiving portion comprises a cutout that extend through the second wall portion.

32. The fiber optic storage module of claim 30, wherein the dust cap receiving portion is configured to limit side-to-side and/or up-and-down movement of the connector.

33. The fiber optic storage module of claim 30, wherein a portion of the retaining portion is configured to extend in a direction parallel to the first wall, the retaining portion is configured to define an opening, the opening comprises a middle retention portion and an entrance portion, and the entrance portion is configured to be smaller in cross-sectional area than the middle retention portion.

34. The fiber optic storage module of claim 30, wherein the first wall portion includes a second retaining structure configured to receive and retain a cable portion of a second fiber optic cable; and
wherein the second wall portion includes a second dust cap receiving portion configured to receive a dust cap coupled with a connector that terminates the second fiber optic cable.

35. A fiber distribution hub comprising:
a frame body including a mounting panel; and
the fiber optic storage module of claim 30 coupled with the mounting panel.

36. The fiber distribution hub of claim 35, further comprising at least one adapter coupled to the frame body.

37. The fiber distribution hub of claim 35, wherein the mounting panel is configured to be removably coupled with the frame body.

* * * * *